US008839890B2

(12) United States Patent
Caruso et al.

(10) Patent No.: US 8,839,890 B2
(45) Date of Patent: Sep. 23, 2014

(54) APPARATUS AND SYSTEM FOR LOW VOLTAGE DIRECT CURRENT AT INDUSTRIAL POWER RECHARGING OF HYBRID HIGH OCCUPANCY CAPACITY ON-ROAD TRANSPORTATION VEHICLES

(76) Inventors: Anthony Nicholas Caruso, Kansas City, MO (US); Walter Daniel Leon-Salas, Kansas City, MO (US); Sridhar Reddy Vanja, Kansas City, MO (US); Thomas C. Caruso, Littleton, CO (US); Michael William Kelly, Kansas City, MO (US)

( * ) Notice: Subject to any disclaimer, the term of this patent is extended or adjusted under 35 U.S.C. 154(b) by 247 days.

(21) Appl. No.: 12/800,827

(22) Filed: May 24, 2010

(65) Prior Publication Data

US 2010/0300780 A1 Dec. 2, 2010

Related U.S. Application Data

(60) Provisional application No. 61/216,969, filed on May 26, 2009.

(51) Int. Cl.
*B60L 9/00* (2006.01)
*B60K 6/442* (2007.10)
*B60M 1/12* (2006.01)
*B60L 11/18* (2006.01)
*B60L 5/26* (2006.01)
*B60K 6/46* (2007.10)

(52) U.S. Cl.
CPC .......... *B60M 1/12* (2013.01); *Y02T 90/128* (2013.01); *B60Y 2200/143* (2013.01); *Y02T 90/14* (2013.01); *Y02T 10/7088* (2013.01); *Y02T 10/7005* (2013.01); *B60L 11/1816* (2013.01); *B60L 5/26* (2013.01); *B60L 2200/18* (2013.01); *Y02T 10/6217* (2013.01); *Y02T 90/121* (2013.01); *B60L 11/1837* (2013.01); *B60K 6/46* (2013.01)

USPC .............................. 180/2.1; 180/65.23

(58) Field of Classification Search
USPC ............... 180/2.1, 65.31, 65.23, 65.265
See application file for complete search history.

(56) References Cited

U.S. PATENT DOCUMENTS

| 5,351,775 | A * | 10/1994 | Johnston et al. | 180/65.31 |
|---|---|---|---|---|
| 5,565,751 | A * | 10/1996 | Greiser | 318/801 |
| 5,582,262 | A * | 12/1996 | Wust | 180/2.1 |
| 7,451,839 | B2 * | 11/2008 | Perlman | 180/2.1 |
| 7,890,218 | B2 * | 2/2011 | Adams et al. | 700/300 |
| 7,906,862 | B2 * | 3/2011 | Donnelly et al. | 290/6 |
| 8,324,858 | B2 * | 12/2012 | Hill et al. | 320/109 |
| 2004/0216636 | A1 * | 11/2004 | Emori et al. | 105/26.05 |

* cited by examiner

*Primary Examiner* — John Walters

(57) ABSTRACT

The invention presents a dual-mode hybrid high occupancy capacity vehicle (HHOCV) with a novel electrical energy and power storage application, electrical energy and power source and charging system in conjunction with additional methods to maximize the energy and rate of use such that the overall system is far superior to multiple personal transportation vehicles and roadway based catenary mass transit systems, including, but not limited to petroleum-only fueled high occupancy capacity vehicles. The HHOCV exhibits a novel battery charging system by taking advantage of existing track/trolley/catenary facilities for electrically charging its electrical storage media at a high energy rate so as to minimize disruption of such charging services, and is not confined by physical boundaries or limitations and may travel off the power source to the existing common roadways returning only to be recharged. The design incorporates software controllers and other devices to maintain the energy transfer rate and is of such physical size that the overall invention may either be retrofitted to existing buses or designed within new high occupancy vehicles.

8 Claims, 3 Drawing Sheets

APPARATUS AND SYSTEM FOR LOW VOLTAGE DIRECT CURRENT AT INDUSTRIAL POWER RECHARGING OF HYBRID HIGH OCCUPANCY CAPACITY ON-ROAD TRANSPORTATION VEHICLES

For purposes of the USPTO extra-statutory requirements, the present application constitutes a regular (non-provisional) patent application of U.S. Provisional Patent Application Ser. No. 61/216,969 filed May 26, 2009.

FIELD OF THE INVENTION

The present invention relates to a dual-mode hybrid high occupancy capacity vehicle (HHOCV) whose on-road electrical energy and power is primarily derived from an electrical storage device whose electrical energy and power is replenished from a unique application of an existing electrical energy power source.

BACKGROUND OF THE INVENTION

Various alternative energy vehicle systems are now commercially available for urban use. Alternative in this context is compared to conventional internal combustion engines that use gasoline, diesel, natural gas, propane or other standard non-electric medium as its fuel source. The most ubiquitous of these vehicle systems is the gasoline-electric hybrid system where an electric motor is used to supplement the gasoline engine. The electric motor receives the bulk of its electrical energy and power from a battery pack that is charged during deceleration (regenerative braking) of the vehicle or by the gasoline engine. Recently, a plug-in version of the gasoline-electric hybrid vehicle has been made available that adds electrical energy storage capacity and charging of that additional storage capacity via a residential convenience 120 VAC outlet. The next logical step is the use of this alternative hybrid technology to replace multiple gasoline driven individual automobiles with a mass transit system composed of high occupancy vehicles with the same or better access to the road systems and without requiring new and costly charging stations for their batteries. This invention satisfies this next step as well as providing overall higher total efficiency.

SUMMARY OF THE INVENTION

A unique method of recharging high energy and high power density storage devices, from existing facilities is offered. The new recharging method claimed here is by a pantograph-type power collection system from high voltage direct current overhead catenary line for light rail, high-speed train, trolley or comparable power sources at 300-700 VDC at up to 3000 A. The invention would utilize a safe and efficient battery system that takes charge at a much faster rate than conventional lead-acid- or lithium-based-batteries and is superior in nameplate cycles for deep (i.e. greater than 80 percent) depth-of-discharge as well as in power/energy density. The invention may be added on to existing high occupancy capacity vehicles or included in original designs. The faster charge rate and greater depth-of-discharge of the electric energy and power storage devices allows the system to charge for a shorter period of time and draw more total energy than conventional counterparts. This enables the (HHOCV) system claimed here to obtain its recharge of the all-electric mode charge-depleting batteries and/or capacitors from a pantograph which extends upward to make a connection with a direct current catenary line. As typical catenary systems operate at approximately 300-700 V direct current (VDC) or greater, the efficiency through which the recharging occurs is vastly greater than with multiple 120 VAC convenience receptacles for individual automobiles and does not require a voltage rectification circuit. Further, the ability to recharge by pantograph connection to a typical light rail/catenary type system allows for the vehicle to make convenient and efficient quick recharging stops, coordinated so as not to result in physical or electrical-load-obstruction of the light rail or trolley cars or system. The HHOCV invention described herein may either recharge by coordinating with, be a replacement/substitute for, or seamlessly mesh with the light rail/catenary substations through the use of a system compatible load shedding controller such that the occasional HHOCV recharging will not impact the design margin of the original rail/catenary substations. These and the advantages described in the abstract above form the basis for the invention described herein.

DETAILED DESCRIPTION OF THE INVENTION

This invention embodies the coupling of an HHOCV to a light rail or trolley car catenary or comparable energy and power delivery system, as a novel energy and power source for substantial and quick energy and power transfer to onboard electrical energy storage devices. The time and frequency of recharging depend on the conventional fuel consumption reduction desired, physical route characteristics (resultant battery discharge) and emissions reduction desired. When or if the petroleum-fueled engine is desired or required to operate, the fuel savings should be even higher, due to the all-electric components assuming the peak torque conditions, allowing the internal combustion engine to remain at or close to constant revolutions per minute (rpm). Further, the incorporation and partial supplementation or use of capacitors during peak power or torque demand will substantially extend the energy available from the batteries.

In practice, the HHOCV would drive under an existing catenary line (e.g. in a yard or spur area), raise the pantograph, verify the vehicle ground, and charge the onboard electrical energy devices using essentially the maintenance power of the system during the intermittent zero or low demand on the design load for a given substation's primary source. The HHOCV controller would ensure that the superposition of multiple HHOCV's recharging simultaneously would not overcome the design load of each respective substation and together, their primary. Similar power sources to the light rail, such as $3^{rd}$ rail, are considered derivative or an obvious extension of the invention described here.

A conventional light rail system whose electrical power is derived by catenary also forms part of the basis for this invention with respect to the dual interlock for grounding. This dual interlock will assure that a ground is made and the vehicle is safely grounded.

Figure 1:
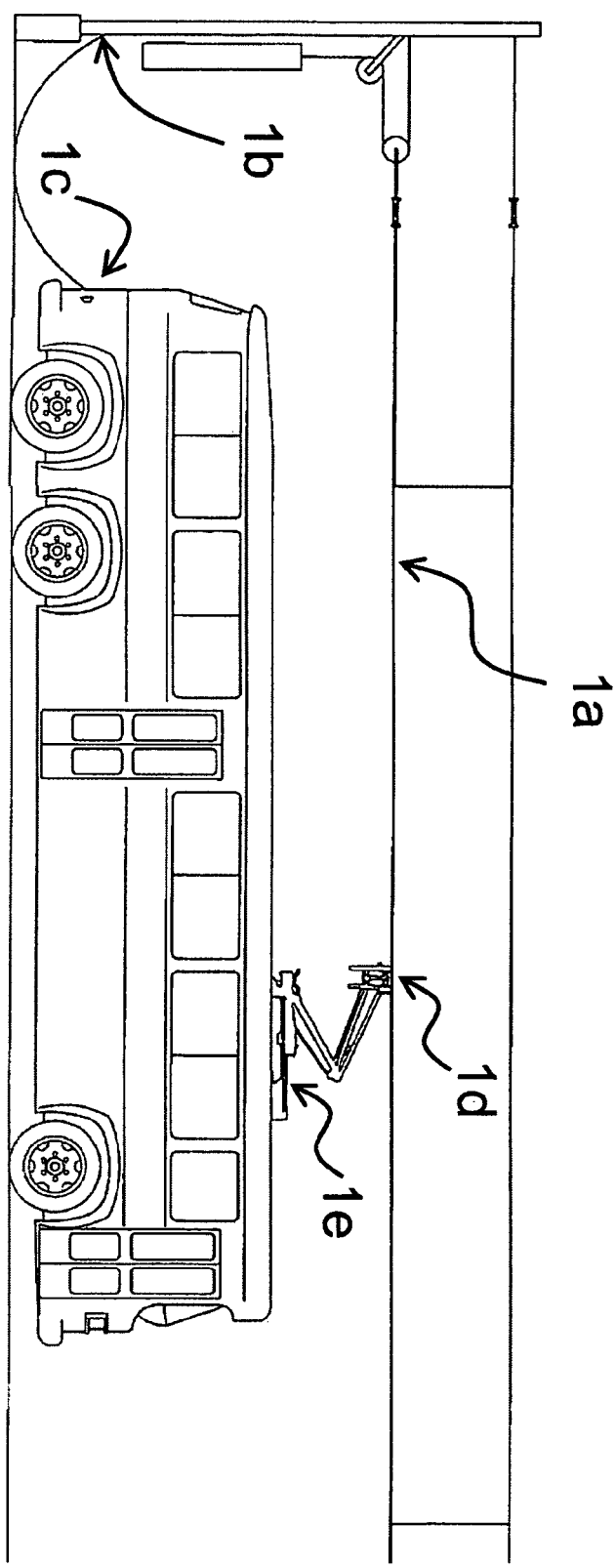
FIG. 1. Catenary, Ground, Single Mode Bus, Pantograph—A pantograph $1a$ is affixed to the top of a single-mode hybrid high occupancy capacity vehicle (HHOCV) to form a dual mode HHOCV capable of drawing electrical power $1b$ from an overhead catenary $1c$. The HHOCV also includes an external electrical conductor capable of establishing electrical ground.
Figure 2:
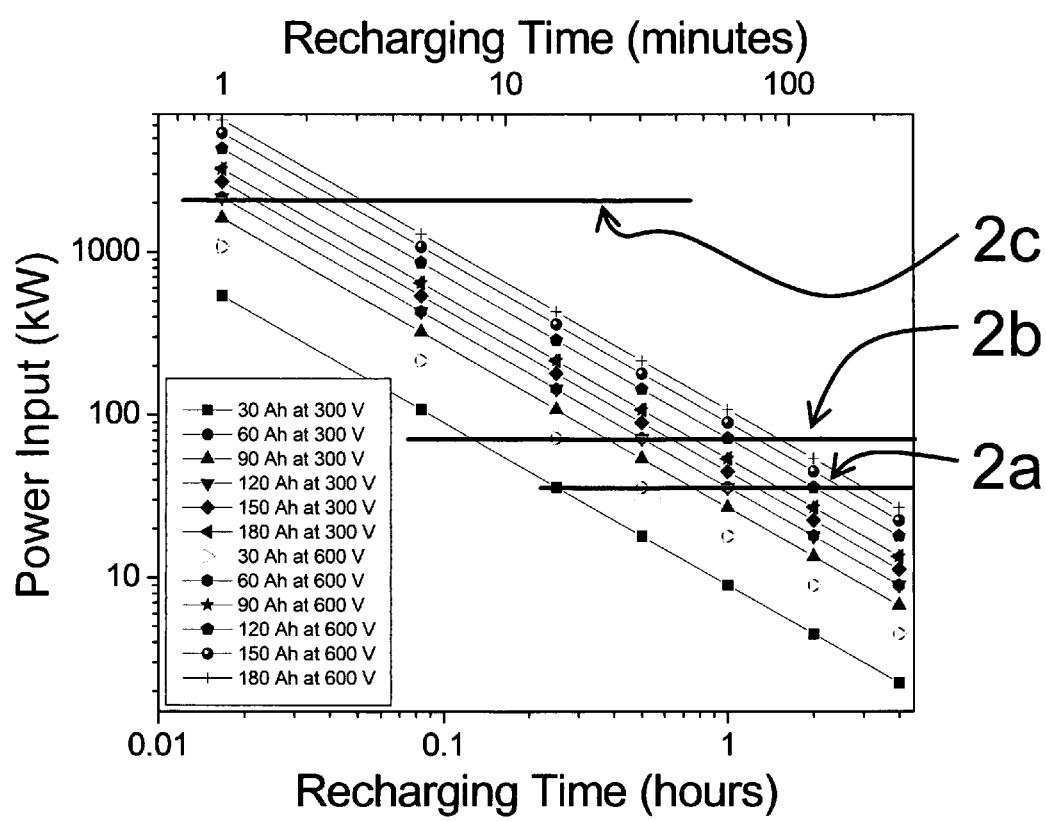
FIG. 2. Power Input vs. Recharging Time Comparison—Power input vs. recharging time as a function of various capacity battery systems for 300 and 600 VDC. $2a$ shows the power line available from a standard commercially available recharging unit at 36 kW [1]. $2b$ is the power line for a custom recharging station at 70 kW [2]. $2c$ is the power line for the technology represented here at 2.1 MW. As an example comparison, a 150 Ah battery at 600 V requires 157 minutes to charge from the 36 kW system, 78 minutes from the 70 kW system and less than 2 minutes with the 2.1 MW system proposed here. [1] Enova Systems 36 kW off-board charging system, Model FCS36; [2] Tindo Custom Recharging Unit, 400 VAC-3Ø, 100 A Input; 386 VDC, 200 A, 70 kW output.
Figure 3:
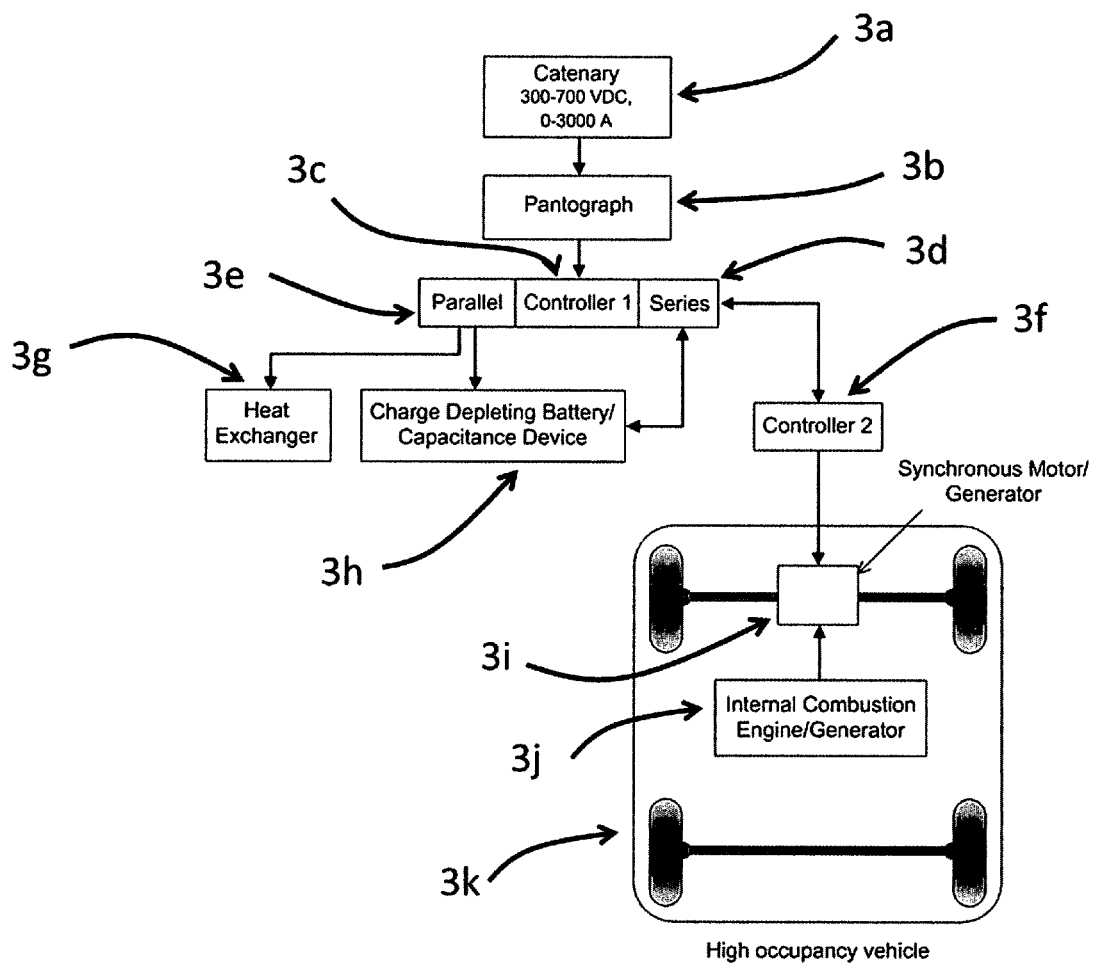
FIG. 3. Flow Diagram—The catenary provides power to the series/parallel switching hardware and heat exchanger. The battery system monitors the state-of-charge, regulating the battery charge/capacitance device input and output. The flow diagram indicates how the primary power drive (variable DC motor), and secondary power drive (Backup Combustion Engine/Generator, low speed/high torque transmission) are configured. It also indicates how the Backup Combustion Engine/Generator interacts between the primary and secondary power drives and torque sensing hardware.

The switching of the batteries from series to parallel for faster charging and the affect on the charging time due to this change is as shown in FIG. 2 (line 2c) which is new art with respect to speed and efficiency of energy transfer. The onboard recharging and regulation circuitry (Controller—FIG. 3) will sense available power from the 300-700 VDC catenary for an acceptably quick and safe charge. This process is also new art because very significant power (up to 10 MW) can be transferred to onboard electrical energy and power storage devices. This art is further enhanced by the type of batteries (Li-ion, Ni-metal hydride, molten salt) and their configuration that may be used in conjunction with the catenary as a high energy transfer source for recharging.

A combustion engine powered generator will provide emergency power to the direct variable drive DC motor or electric motor if battery/capacitance device power is accidentally depleted. Torque sensing hardware will transfer battery/capacitance device power to the electric motor-torque transmission in high torque situations or reverse mode.

Since light rail systems in large metropolitan areas already exist adjacent to established bus routes, this invention will be immediately functional.

| Potential Existing Catenary Systems | |
|---|---|
| Sacramento, CA | Houston, TX |
| San Jose, CA | Charlotte, NC |
| Los Angeles, CA | Miami, FL |
| San Diego, CA | New York, NY |
| Phoenix, AZ | Boston, MA |
| Denver, CO | Newark, NJ |
| San Francisco, CA | Pittsburg, PA |
| Seattle, WA | Philadelphia, PA |
| Portland, OR | Baltimore, MD |
| Salt Lake City, UT | Toronto, Canada |
| St. Louis, MO | Montreal, Canada |
| Dallas-Ft. Worth, TX | Mexico City, Mexico |
| Chicago, IL | |

ENERGY STORAGE. The energy storage is embodied within the charge-depleting battery and/or capacitance devices. The energy storage system enables the acceptance of electric power in the range of 0 to 3,000 ADC at a potential of from 300 to 700 VDC. It is the greater than 0.5 MW power that defines "industrial" power and at the highest range of low voltage that represents the 300 to 700 VDC potential. This storage rate is over two orders of magnitude above that which is possible via residential and commercial power sources. This allows the dual-mode hybrid vehicle to travel independent of its interconnection to the primary energy source.

Further, the presently existing infrastructure of these railway stations from which the incomparable energy transfer may take place, can occur without modification to the existing infrastructure facilities. The present and future electrical capacity of these railway electrical substations that feed the electrical energy to the railway stations is fixed. The existing infrastructure to supply these existing railway substations is therefore static and subject only to maintenance. The existing infrastructure to supply these existing railway substations with capacities up to 10 MW exists in a range of distributed substations. This electrical energy transfer rate is unimpeded throughout the contiguous interconnection of the existing catenary-rail system. The load factor (the period of time a system is used divided by the time available) is far less than unity. The load factor is even less at the railway lines where the dual-mode hybrid vehicle listed would take energy from this existing system. The novel use of the dual-mode hybrid vehicle is its ability to operate Off-Track on any line that is less frequented by the existing railway system vehicles and receives its energy at a high rate of storage so as not to impact the existing operations and most importantly receive this energy at a rate no greater than the draw of the existing railway facilities in order to have no impact whatsoever on the existing infrastructure that feeds the existing railway substations. The presently existing energy transfer capability of the existing substations that feed electrical energy to the existing railway facilities and equipment is the source from which we envision the dual-mode hybrid vehicle claimed will obtain its electrical energy. The charge depleting batteries and/or capacitors are located within the dual mode hybrid vehicle and are sized to accept energy at nearly the maximum rate allowed by the existing railway system substations to reduce charging time "On Catenary". The charge rate of these charge depleting batteries and/or capacitors is controlled such that their rate of energy transfer (power) may be matched to the existing substation limitation whether by temporary or permanent reduced capacity of the individual section. The energy transfer range is presently envisioned as from near zero to as high as 2,100 kW.

This example describes accepting charge below the operating margin for a 3,000 kW or greater rated substation. If for some unknown reason the energy transfer capability of the line is affected during charging or recharge, the controller within the hybrid vehicle will reduce the energy transfer rate until the energy balance is restored (voltage drops are returned to normal ranges or current rate of change is returned to normal values or the monitored DC waveform returns to that expected of an ANSI class 31 device) or the transfer rate is diminished to zero at which time the hybrid vehicle would disengage. Regardless of the energy transfer rate set to charge or recharge the depleting batteries and/or capacitors contained within the dual mode hybrid vehicle, the novel approach to energy transfer is this dual mode hybrid vehicle controller never takes energy above the transfer capacity of the line where the hybrid vehicle is temporarily connected "On Track".

Embodied within the energy storage claimed is the conventional storage capability. The conventional storage capability is capable of accepting the lower energy storage rate. This lower energy storage rate remains over one order of magnitude greater than that which is possible via residential and/or commercial power sources. This conventional storage capability is limited only by the capability of the existing railway catenary substations to provide power to the overhead catenary during intermittent periods of maximum system demand.

Embodied within the energy storage claim and the conventional storage capability listed, there exists the On/Off Catenary energy storage. Significant to these claims are the capability of the dual-mode hybrid vehicle to absorb energy at the rates listed (On Catenary) where electrical power is obtained from the existing railway catenary system at the reduced rate, but also to disengage from the existing catenary (Off Catenary) and travel on existing roadways utilizing the energy so derived from the lower energy storage capable catenary. The lower energy storage capable catenary provides for transporting freight and personnel at significantly reduced impact to the environment (little when operating via the diesel generator to no local pollution) when operating via the electric motor/generator. This approach provides a higher efficiency than capable from any residential and/or commercial energy source due both to the higher transfer rate and optimization of the battery energy using the tempering capability of the capacitance devices. Also embodied within the energy storage and the conventional storage capability claimed, there exists the Battery/Capacitor storage dependencies. Significant to this claim is the tempering capability of the capacitance devices, which allows the batteries to discharge at a more moderate rate when taking advantage of dynamic braking along the roadway route. It is envisioned that the battery efficiency will be improved by 12 percent due to this tempering effect even with the more moderate transfer rate.

Embodied within the energy storage claimed is the novel storage capability. The novel storage capability is capable of accepting the higher and highest energy storage rate. This higher energy storage rate is over two orders of magnitude greater than that which is possible via residential and/or commercial power sources. The conventional storage capability is limited only by existing railway catenary substations which provide power to the overhead catenary at or above 10 MW.

Embodied within the energy storage is the novel storage capability claimed in that there exists the On/Off Catenary energy storage. Significant to this claim is the capability of the dual-mode hybrid vehicle to absorb energy at the rates listed (On Catenary) where electrical power is obtained from the existing railway catenary system at the full rate of at or above 10 MW, but also to disengage from the existing catenary (Off Catenary) and travel on existing roadways utilizing the energy so derived from the maximum energy storage capable catenary. The maximum energy storage capable catenary provides for transporting freight and personnel at an even more significantly reduced impact to the environment (little when operating via the diesel generator to no local pollution) when operating via the electric motor/generator, higher efficiency than capable from any residential and/or commercial energy source due both to the higher transfer rate and optimization of the battery energy using the tempering capability of the capacitance devices. Also embodied within the energy storage and the novel storage capability is the Battery/Capacitor storage dependencies. Significant to this claim is the tempering capability of the capacitance devices, which allows the batteries to discharge at a more moderate rate when taking advantage of dynamic braking along the roadway route. It is envisioned that the battery efficiency will be improved by 17 percent due to this tempering effect with the higher transfer rate.

CATENARY SYSTEM. The catenary system claimed is embodied within the existing railway electric distribution system that presently exists at twenty-six (26) Catenary Systems identified previously within the United States, Mexico, and Canada. These existing catenary systems are just as important a claim for the delivery of the electrical energy at an incomparable transfer rate as is the retrofitted or constructed high occupancy dual-mode hybrid vehicle for receiving these extraordinary amounts of portable power. The catenary system is the source of the electric power to these charge-depleting battery and/or capacitance devices contained within these high occupancy dual-mode hybrid vehicles. The catenary system enables the delivery of electric power in the range of 0 to 3,000 ADC at a potential of from 300 to 700 VDC distributed throughout the previously listed locations and embedded within the working infrastructure wherein no additional equipment, increases in capability or special provisions for attachment are required outside that contained within the dual-mode hybrid vehicle. This delivery rate of the catenary system is over two orders of magnitude above that which is possible via residential and commercial power sources. This claim allows the dual-mode hybrid vehicle to receive sufficient energy from the existing infrastructure to travel independent of this interconnection.

Embodied within the catenary system claimed is the presently existing locations of these railway stations from which the incomparable energy transfer may take place due to convenient locations. The locations of these railway stations where the stated energy transfer capability of electric power in the range of 0 to 3,000 ADC at a potential of from 300 to 700 VDC exists today are distributed throughout these previously listed locations approximately one-mile apart providing easy and convenient access to the energy source. The novel locations at which the dual-mode hybrid vehicle would receive this energy would be at electrified section lines (required due to the catenary-rail provisions required for operation of the existing railway systems) used as "setouts" by the existing railways vehicles.

CONTROLLER. The controller system claimed is a novel combination of control modes which will sense and allow energy transfer to storage systems within the hybrid vehicle to match seamlessly and not adversely impact the existing operations of the various existing section locations, the existing infrastructure upon which this existing electric railway system is built, and the energy transfer limitations that may be encountered during operating conditions. The control mode Efficiency, improves efficiency to further the considerable economy of scale already present within the system. The control mode Depth-of-Discharge, limits depth of discharge to prevent battery polarity reversal and also keeps track of nameplate cycles and monitors various conditions of the battery (temperature, charge and discharge status, cell condition, reverse charge, equal charge, equal voltage, etc.) all of which affect and/or monitor/prolong battery health. The control mode Distance, is an override to maximize the distance the hybrid vehicle may cover without regard to efficiency should such be warranted. The control mode Heat Transfer, utilizes the waste heat from the batteries for comfort control or minimizes the waste heat from the batteries during operation or charging/recharging cycles or cools by ducting and air circulation of the batteries for prolonged life. Any combination of these waste heat mode capabilities may be used dependent on the outcome of interest. The control mode Grounding and Safety Interlocks, ensures that the grounding condition is met (via mechanical interlocks) prior to charging, ensures the grounding condition is removed only when the pantograph has retracted and is in its locked position, and ensures the grounding condition has been removed prior to moving of the hybrid vehicle.

Series/Parallel. The control mode Battery/Capacitor—Series/Parallel, controls the rate of charge of the battery/capacitor systems as well as discharge and regenerative braking for further energy savings. This mode also senses when the system is connecting to a high power capacity spur substation such that the batteries need/should be connected into a parallel configuration for faster charging and later back to a series connection for matching the operating voltage during normal operating modes. This mode can also change the series/parallel configuration of the batteries and capacitors as a coarse setting for speed control or torque control of the dual-mode hybrid vehicle. In conjunction with the controller, the series/parallel system is capable of providing a recharging rate of twelve times the battery capacity (12 C) for 180 Ah capacities and up to 60 C for battery capacities of 90 Ah, both at 600 V. Ref line A in FIG. 2, for the power (at 600V) which is less than envisioned with the 700 VDC system claimed here. A further advantage of the high current capability when in parallel mode and taking power at a high rate from the catenary is in the melting of electrolyte solids toward their molten phase for battery operation. Specifically, when utilizing molten salt or thermal rechargeable batteries, that utilize materials such as Ni—$NaAlCl_4$ (Na—$NiCl_4$), Na—S or Li—S are inactive in their solid phase and require substantial heat from resistive electrical heating or comparable to change the electrolyte from a solid to molten phase. The $NaAlCl_4$ melts at 157° C. and has an average operating temperature of 270-350° C. The melting procedure requires at least 24 hours from a 230 VAC, 15.5 A circuit (85 kWh) per module; but merely minutes from the high voltage and current capability of the existing catenaries. Lastly, another advantage of high current is its ability to recharge a system that switches the battery cells or capacitors from a series operating connection to a full or partial parallel recharging connection. Such parallel recharging is advantageous as it reduces loss and recharge time due to one unhealthy cell.

Active Heat Exchanger. Embodied within the controller and incorporating thermal transfer devices along the distributed batteries are the constituents of an active heat exchanger system for vastly increasing the charge and discharge rate of these batteries by removal of the internal heat generated during these functions. The heat may be used in numerous fashions dependent on the seasons for passenger comfort but critical to the charge/discharge efficiency and overall battery life will be maintaining individual battery cell temperatures that demands an active in lieu of passive heat exchanger system.

Equipment Based Embodiments of Claims 1c and 4a. A single variable electric drive motor/generator is the sole mechanical power source for the HHOCV receiving electrical power either from the internal combustion engine generator or the batteries/capacitors all in conjunction with the controller which is auctioneering for the better of the two electric sources based on its operating mode. This single variable electric drive motor/generator doubles as a regeneration source to charge the batteries/capacitors during braking and deceleration. The low-speed/high-torque transmission will allow the internal combustion engine to remain as small as possible and use the least liquid fuel. Any shifting required will be determined by the controller in conjunction with the torque sensing hardware shown on FIG. 3.

The invention claimed is:

1. An apparatus, comprising:
a high occupancy capacity on-road transportation vehicle configured for locomotion without external electrification by an external electrical energy source;
a plurality of electrical energy storage devices disposed onboard the high occupancy capacity on-road transportation vehicle including at least two or more battery cells; and
an electrical energy transfer device configured to:
couple the external energy source to the plurality of electrical energy storage devices during a recharging phase in order to transfer energy from the external electrical energy source at a power level above 2.1 MW to the plurality of electrical energy storage devices; and
decouple the external electrical energy source from the plurality of electrical energy storage devices during a locomotive phase, wherein the plurality of electrical energy storage devices are configured to provide locomotive power to the high occupancy capacity on-road transportation vehicle during the locomotive phase, wherein the electrical energy transfer device is disposed on the high occupancy capacity on-road transportation vehicle;
one or more controllers disposed on the high occupancy capacity on-road transportation vehicle, the controller configured to:
sense an available power source from a catenary; and
switch two or more battery cells from a series coupling to a parallel coupling during the recharging phase in order to achieve a recharging time of the plurality of electrical energy storage devices via the electrical energy transfer device of less than 3 minutes for power delivered above 2.1 MW.

2. The apparatus of claim 1, further comprising: a direct variable drive motor and torque sensing transmission disposed on the high occupancy capacity on-road transportation vehicle.

3. The apparatus of claim 1, further comprising: an electrical energy producing device disposed on the high occupancy capacity on-road transportation vehicle.

4. The apparatus of claim 3, wherein the electrical energy producing device comprises: a supplemental energy system comprised of an internal combustion engine with electrical generator.

5. The apparatus of claim 1, further comprising: an electrically driven heat exchanger disposed on the high occupancy capacity on-road transportation vehicle.

6. The apparatus of claim 1, wherein the electrical energy storage devices comprise: electrochemical energy storage capable of receiving at least industrial power at the highest range of low voltage DC.

7. The apparatus of claim 1, wherein the plurality of electrical energy storage devices comprise: electrochemical-capacitive energy storage capable of receiving at least industrial power at the highest range of low voltage DC.

8. The apparatus of claim 1, wherein the electrical energy transfer device comprise: an electrical energy transfer device having a pantograph type power collector.

* * * * *